United States Patent [19]

Osterode

[11] Patent Number: 4,505,292
[45] Date of Patent: Mar. 19, 1985

[54] VALVE FOR ABRASIVE MIXTURES

[75] Inventor: Ulrich Osterode, Neustadt, Fed. Rep. of Germany

[73] Assignee: Claudius Peters AG, Fed. Rep. of Germany

[21] Appl. No.: 511,457

[22] Filed: Jul. 7, 1983

[30] Foreign Application Priority Data

Oct. 14, 1982 [DE] Fed. Rep. of Germany ....... 3238059

[51] Int. Cl.$^3$ .............................................. B08B 3/04
[52] U.S. Cl. .................................... 137/240; 251/333
[58] Field of Search ............... 137/238, 240; 251/332, 251/333

[56] References Cited

U.S. PATENT DOCUMENTS

| 691,975 | 1/1902 | Schaaf | 137/240 |
| 2,693,201 | 11/1954 | Page | 251/333 |
| 3,583,426 | 6/1971 | Feres | 137/240 |

Primary Examiner—George L. Walton
Attorney, Agent, or Firm—Eric P. Schellin

[57] ABSTRACT

A closing arrangement for a conveyor line for a mixture containing an abrasive solid is composed of a fluid-tight valve and of a solid-tight auxiliary closing part which acts in the direction of flow in front of the valve and can be closed before the valve in time to protect it. According to the invention the auxiliary closing part is formed by a casing arranged inside the valve which casing is movably guided in the direction of the movement of the valve disk. This casing protects the valve seat from the flowing medium in a direct end position which it assumes when the valve is open. During the closing movement the valve disk contacts the casing edge before it reaches the valve seat. This essentially blocks off at least the abrasive part of the flow medium, so that the valve disk can approach the valve plate under protected conditions, while at the same time the casing is pushed against an elastic force. Rinsing devices can be provided between the casing and the valve seat which act in the closing phase between the time the valve disk contacts the casing and the time it contacts the valve seat. The rinsing current can be controlled by a separate control device or automatically by the shifting of the casing or of a closure member connected to it in relation to a rinsing opening.

3 Claims, 5 Drawing Figures

VALVE FOR ABRASIVE MIXTURES

FIELD OF THE INVENTION

This invention is a closing arrangement for a conveyor line passing an abrasive mixture containing a solid. The closing arrangement comprises fluid-tight valve which consists of a valve housing which forms a valve seat around a valve opening and of a valve disk located downstream from it, and also comprises an essentially solid-tight, but not necessarily fluid-tight auxiliary closing part which acts in the direction of flow in front to the valve and can be closed before the valve in time in order to protect it.

BACKGROUND OF THE INVENTION

If gases or liquids containing solids are to be closed off fluid-tight under a considerable pressure difference, as is necessary, for example, at the fill openings of pressure containers for pneumatic pressure conveyors, a valve with a high-quality gas and liquid-tight construction of the valve disk and of the valve seat must be used, which usually requires surfaces and work materials which are exposed to wear. When such valves are closed, high flow speeds which cause heavy wear can occur at the sealing surfaces. Particles can also be enclosed between the cooperating pressure surfaces of valve disk and valve seat and destroy the surfaces under the force of closure. In order to avoid this, an auxiliay closing part is put in front of the fluid-tight valve which is essentially solid-tight or at least retains coarse solids such that the valve can be closed in a protected manner at a low flow speed and in the absence of solids or at least of coarse solid particles. Such an arrangement consisting of a valve and an auxiliary closing part is complicated.

The invention therefore has the task of reducing the space requirements and the expense of construction.

SUMMARY OF THE INVENTION

The invention solves this task as follows: The auxiliary closing part is formed by a casing which surrounds the valve opening, is located inside the valve seat, sealed relative to it and movable in the direction of the movement of the valve disk, and assumes an end position when the valve is open in which position it extends over the valve seat in the direction of flow and from which it can be shifted against an elastic force while placing its downstream edge in a solid-tight manner against the valve disk during the last phase of its closing movement.

In the open position of the valve, the position of the casing extending over the valve seat assures that the valve seat is in the turbulent region and is therefore protected from wear. The feature of the invention that the casing extends over the valve seat, is therefore to be interpreted so that the valve seat is in the turbulent area of the casing under the prevailing conditions of flow.

Since the casing extends over the valve seat, it is closer to the valve disk than the valve seat is. Therefore, during the closing movement the valve disk reaches the downstream edge of the casing first. The elastic force acting on the casing assures that this edge is pressed against the valve disk. This seals the flow path in an essentially solidtight manner. The expression solid-tight means in this connection that, depending on the protective requirements, all solids or at least the coarse particles which could damage the valve seat or the valve disk if they were caught, are retained. It is therefore advantageous, on the one hand, to construct the cooperating surfaces of the casing edge and of the valve disk in such a manner according to tested principles that they can perform this closing function. On the other hand, it is advantageous to make the elastic force so strong that these surfaces are held against each other in a sufficiently effective manner. As a result of the cooperation of valve disk and casing and the arrangement of the casing in the valve housing which is sealed against the valve seat, the abrasive effect of the solid material is kept away in the following phase of the closing movement from the valve seat and the sealing surface of the valve disk which cooperates with the seat, and the valve can close completely under protected conditions.

The best elastic force for forcing the casing into the end position extending over the valve seat and into sealed contact with the valve disk during the last closing phase is spring power and/or gravity. Frictional forces can be used alone or in conjunction with the previously mentioned forces. For example, a frictional contact provided between the casing and a valve disk shaft can entrain the casing into the open end position when the valve disk is opened, while a frictional contact between the casing and the valve housing can assure the required tight press between casing and valve disk during the closing movement of the valve disk. Of course, the frictional forces in such a case would have to be switched so that during the opening movement only or primarily the one and during the closing movement only or primarily the other frictional force is active.

During the closing movement of the valve disk, it must first connect with the casing edge and only later with the valve seat. Therefore, the feature of the invention that the casing extends over the valve seat is also to be interpreted in such a way that this sequence occurs. Since the valve disk does not have to be even, and is only very rarely even, the concept of extension should therefore also be interpreted to mean that the casing edge which cooperates with the valve disk has a lesser distance when the valve is open from the valve disk surface which cooperates with it than the valve seat does from the valve disk surface associated with it.

It is advantageous to provide a rinsing device between the casing and the valve seat which produces a rinsing current during the last closing phase which cleans the cooperating surfaces of valve seat and valve disk. For its control, the control device for the closing of the valve can be constructed so that the rinsing device is turned on in the time interval between the setting down of the valve disk onto the casing and onto the valve seat.

The protective function of the casing in relation to the valve seat is preferably also utilized during the opening process by having the valve disk not come off of the casing edge during the opening movement until the casing has reached its end position which protects the valve seat.

These and further operational and constructional characteristics of the invention will be more evident from the detailed description given hereinafter with reference to the figures of the accompanying drawings which illustrate one preferred embodiment by way of non-limiting example.

DESCRIPTION OF THE PREFERRED EMBODIMENT

Figure 1:
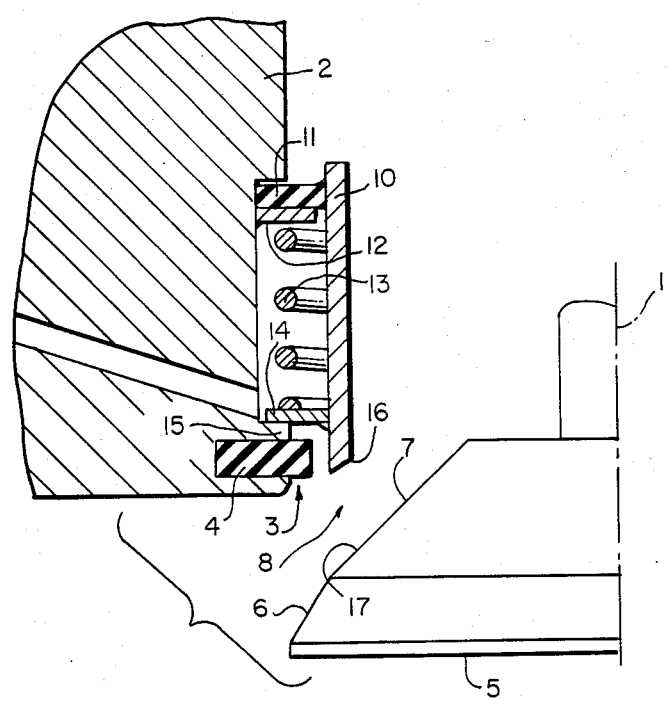
FIGS. 1 to 4 schematically show different functional phases of a bisected valve arrangement.
Figure 2:
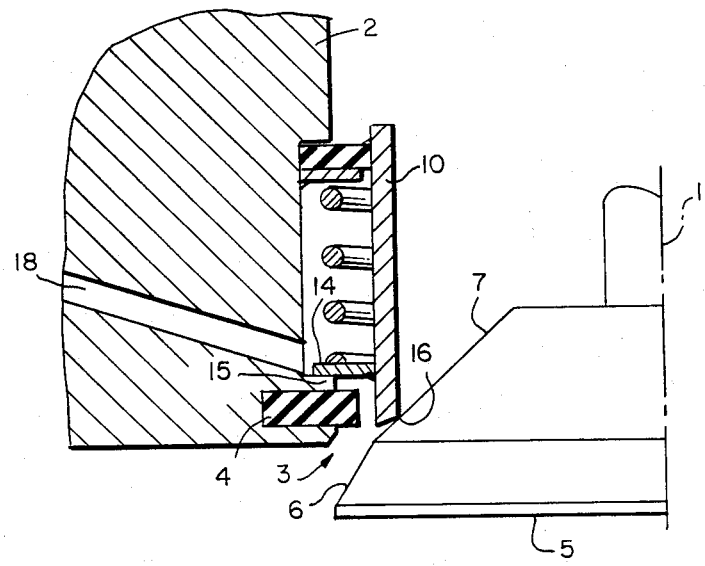
Figure 3:
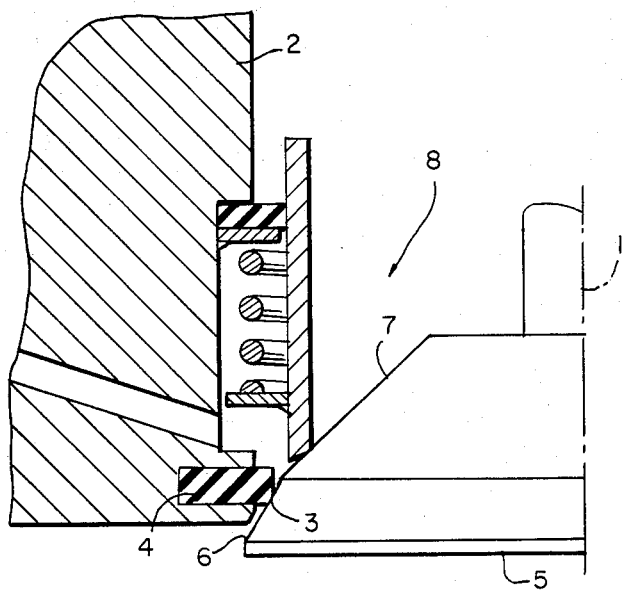
Figure 4:
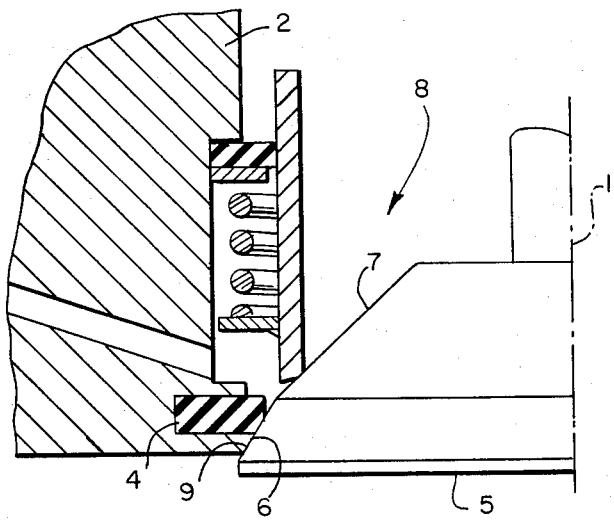

FIGS. 1 to 4 show (in a bisected view in relation to center line 1) valve housing 2, which forms valve seat 3 at its lower end which contains sealing ring 4 made of soft material. Valve disk 5, which is carried by a straight shaft parallel to the direction of center line 1, forms sealing cone 6 at its top which cooperates with sealing ring 4 and also forms another conical surface 7 located radially inside the first cone. Valve disk 5 and valve seat 3 enclose valve opening 8 in a customary manner. During the closing movement valve disk 5 gradually approaches valve seat 3 located coaxially to it until it touches it and compresses it with the required sealing pressure (FIG. 3). The closing force and/or the back pressure to be closed off by the valve arrangement can effect a further compression of the sealing ring (FIG. 4). It is advantageous to protect the sealing ring with stop 9, against which the sealing cone can make contact if the forces are great enough, so that any further, possibly damaging deformation of the sealing ring is avoided.

Casing 10 is located radially inside valve seat 3 as an auxiliary closing part. This casing can shift longitudinally in housing 2 and is sealed against housing 2 by seal 11. Pressure spring 13, which acts between support ring 12 fixed to the housing and a flange permanently fixed to casing 10, forces casing 10 down in the drawings, i.e. in the direction of flow against a stop formed by flange 14 and support ring 15 provided on the valve seat. In this position the casing is in the functional stages according to FIGS. 1 and 2. It is evident from FIG. 1 that it protects sealing ring 4 of the valve seat from the flow of medium in this position. It is also evident that lower edge 16 of casing 10 is closer in this position to surface part 17 of the valve plate axially opposite it than sealing ring 4 is to sealing cone 6.

Figure 5:
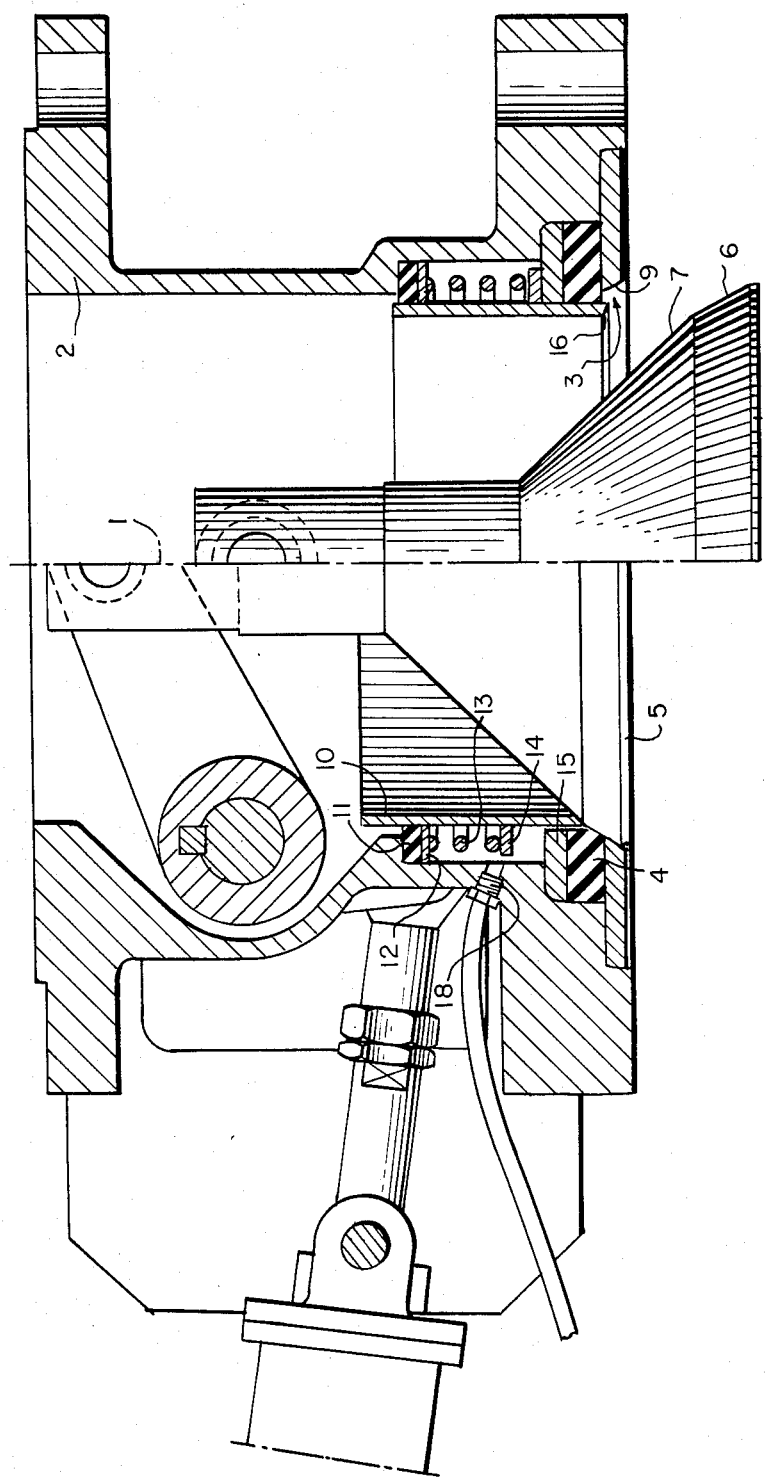
FIG. 5 shows a longitudinal section through a valve arrangement in accordance with the invention.

If the valve disk approaches the valve seat in a closing movement (FIG. 2), surface part 17 makes contact with lower part 16 or casing 10 first, wherewith it blocks off the flow of medium to a large extent. At least the coarser part of the solid material is retained. Rinse borehole 18, which is connected to a source of rinsing medium, e.g. a source of compressed air in pneumatic conveyors, empties into the intermediary space between casing 10 and housing 2. This rinsing borehole is blocked from the valve opening in the open position of the valve (FIGS. 1 and 5) by flange 14 and/or other actively controlled blocking parts. When, however, the rinsing borehole becomes free during the further closing movement of the valve disk (transition from FIG. 2 to FIG. 3), rinsing medium flows between casing 10 and sealing cone 6 on the one hand and valve disk 3 on the other hand and frees it of any adhering solid material.

When sealing cone 6 finally comes to rest on soft seal 4 (FIG. 3), the participating surfaces are largely free of damaging solid material. A considerably longer service life can therefore be expected.

It is not necessary for the invention that the valve has a valve disk which is moved parallel to itself, although this results in the optimum conditions for the application of the invention. The valve disk can also be moved like a flap. The essential thing in this connection is that the guiding of the movement of the casing is coordinated with the direction of movement of the valve disk in such a manner that the valve disk can move the casing out of its end position which protects the valve seat.

This invention is not limited to the preferred embodiment heretofore described, to which variations and improvements may be made, consisting of mechanically equivalent modifications to component parts, without leaving the scope of the protection of the present patent, the charactertics of which are summarized in the following claims.

What is claimed is:

1. A closing arrangement for a conveyor line for an abrasive mixture containing a solid, comprising: a fluid-tight valve having a valve housing which forms a valve seat and a valve disk located downstream from it, and also comprising a solid-tight auxiliary closing part which acts in the direction of flow in front of said valve and can be closed before said valve in time in order to protect it from said abrasive mixture, characterized in that said auxiliary closing part is formed by a casing which surrounds the valve opening, is located inside said valve seat to protect said valve seat from said abrasive mixture, sealed relative to it and moveable in the direction of the movement of said valve disk, and which assumes an end position when said valve is open in which it extends over said valve seat and spaced therefrom in the direction of flow and from which it can be shifted against a spring means while placing its downstream edge in a solid-tight manner against said valve disk during the last phase of its closing movement.

2. A closing arrangement according to claim 1, characterized in that a rinsing device for said valve seat and said valve disk is provided between said casing and said valve disk.

3. A closing device according to claim 2, characterized in that a control device for the valve closing is constructed so that the rinsing device is turned on in the time interval between the time said valve disk contacts said casing and the time it contacts said valve seat.

* * * * *